United States Patent [19]

Vergara

[11] Patent Number: 4,970,791
[45] Date of Patent: Nov. 20, 1990

[54] VEGETATION TRIMMING APPARATUS FOR ROUNDED CONFIGURATIONS

[76] Inventor: Florentino S. Vergara, 2651 Hillsborough Pl., West Covina, Calif. 91792

[21] Appl. No.: 402,621
[22] Filed: Sep. 5, 1989
[51] Int. Cl.⁵ .............................................. B26B 19/02
[52] U.S. Cl. ........................................ 30/216; 30/228
[58] Field of Search ...................... 30/277.4, 216, 224, 30/260, 228

[56] References Cited

U.S. PATENT DOCUMENTS 3,646,675  3/1972  Wezel .............................. 30/277.4 X Primary Examiner—Douglas D. Watts
Attorney, Agent, or Firm—Boniard I. Brown

[57] ABSTRACT

A hedge trimmer whose cutting section is curbed into an arc of a circle for purpose of cutting round shapes.

7 Claims, 2 Drawing Sheets

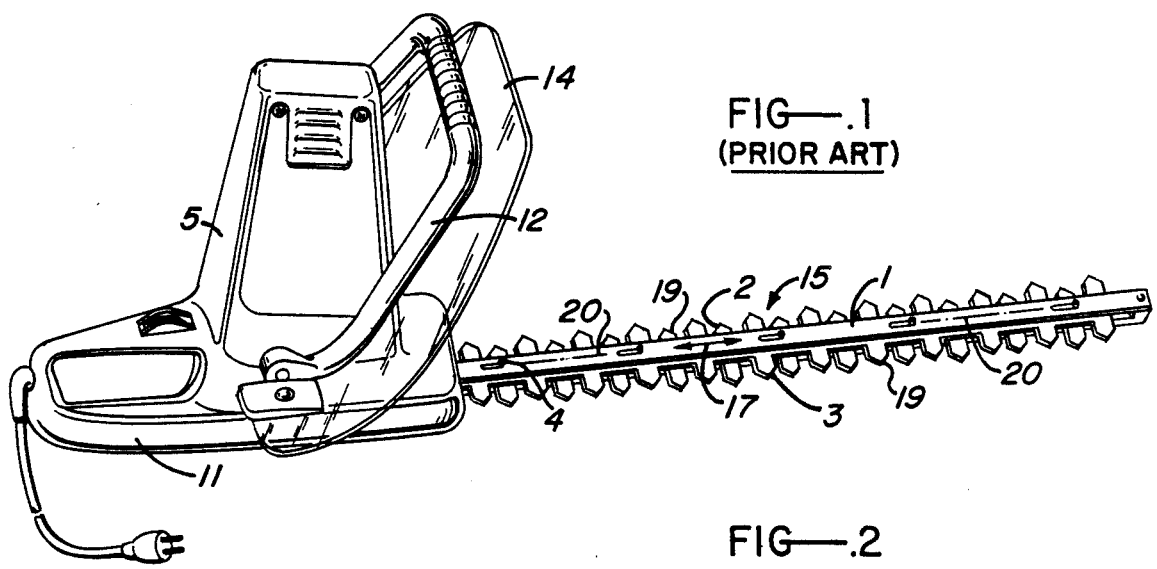
FIG—.1
(PRIOR ART)
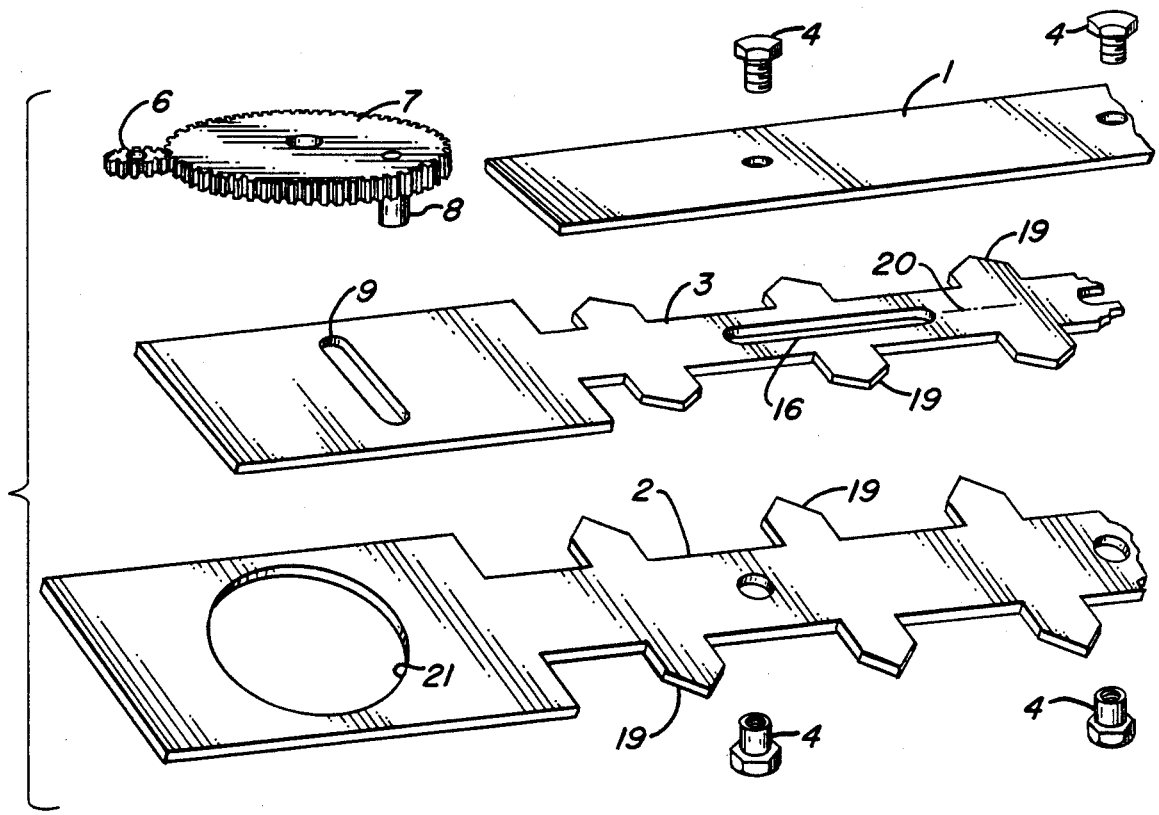
FIG—.2
(PRIOR ART)

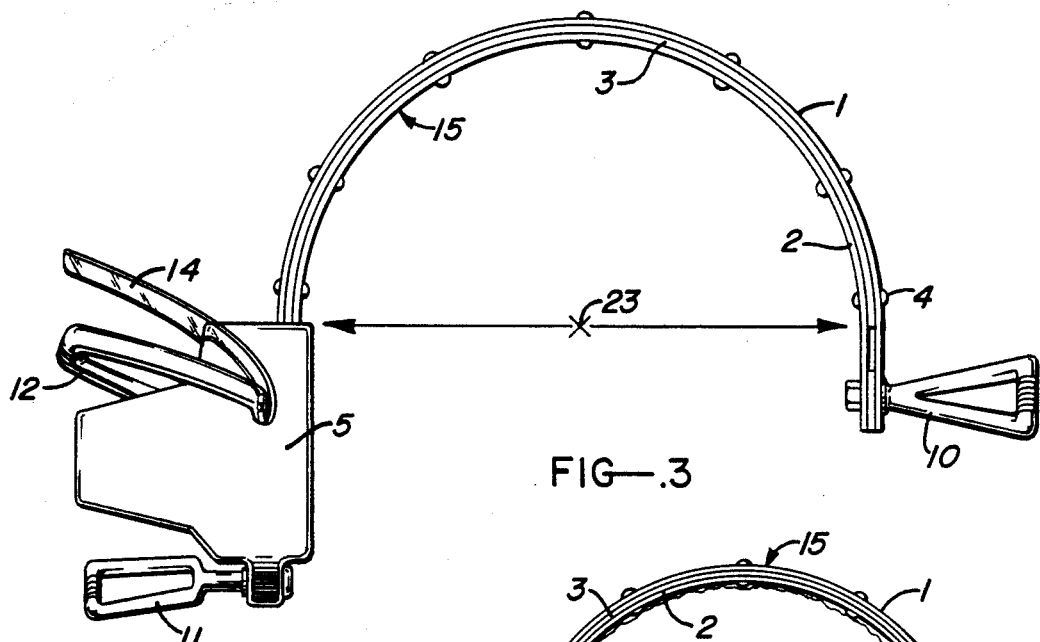
FIG—.3
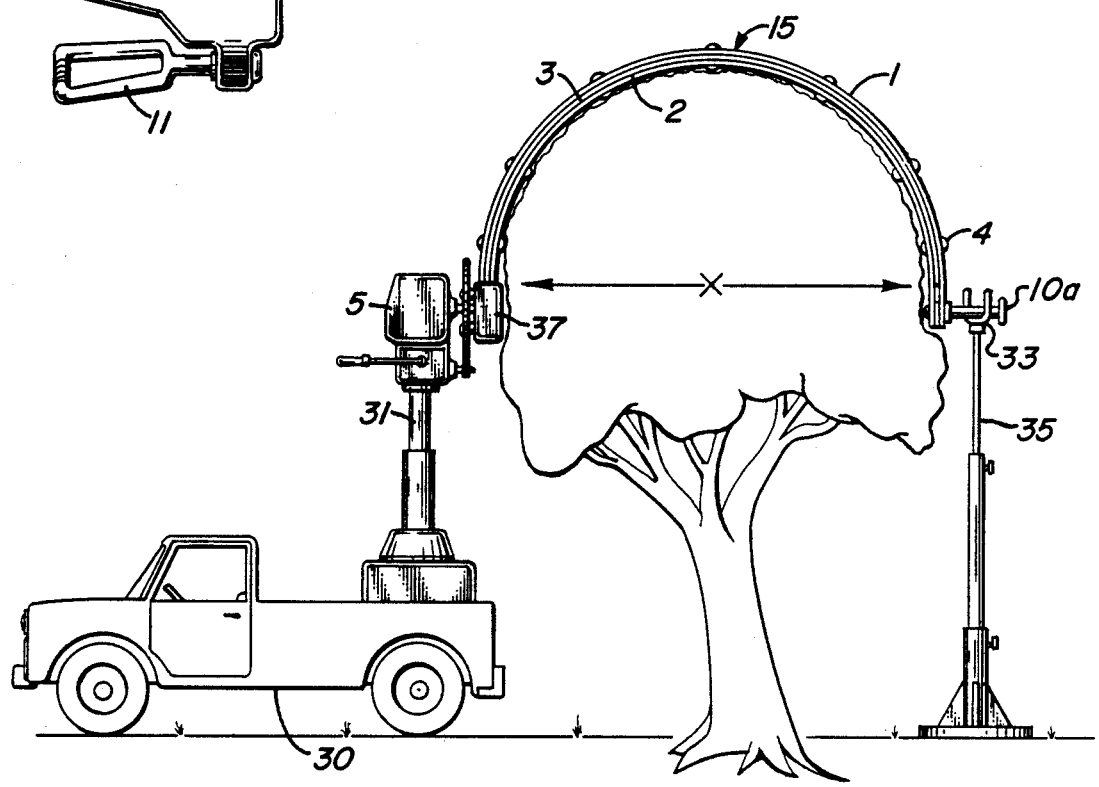
FIG—.4
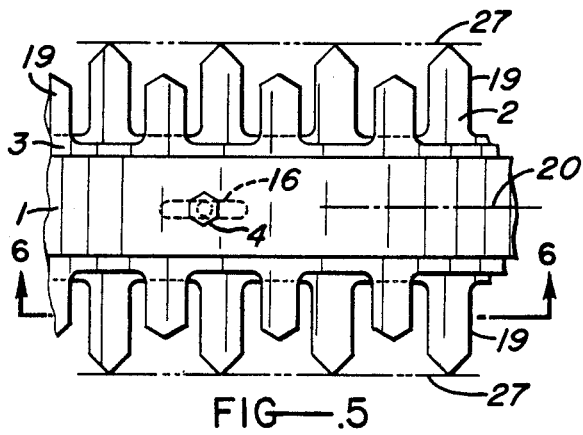
FIG—.5
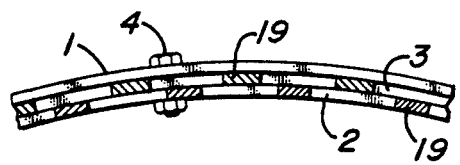
FIG—.6

VEGETATION TRIMMING APPARATUS FOR ROUNDED CONFIGURATIONS

BACKGROUND OF THE INVENTION

The present invention relates to a foliage trimmer designed for cutting the branches of plants, hedges, trees and shrubs. The trimmer is adapted to form rounded profile configurations on growing plants, trees and shrubs.

Conventional foliage trimmers comprise two straight flat blades arranged in facial engagement, with overlapped teeth extending along their registering edges. A motor is arranged at one end of the balde assembly to move one of the blades reciprocally so the registering teeth slide across one another to cut foliage projecting through the spaces between the teeth.

The conventional trimmer cuts in a flat linear plane. In order to form rounded three-dimensional or spherical foliage contours, it is necessary to periodically adjust the angle between the trimmer blade assembly and the foliage surface. Some skill is required to make the necessary adjustments. In many cases the trimmer cuts into the foliage contour or forms a flat spot, thus requiring removal of more foliage than is desired. The final condition of the foliage is often not the symmetrical rounded condition which was initially intended.

SUMMARY OF THE INVENTION

The present invention is directed to a foliage trimmer that can cut in a curved arcuate line, such that the trimmer configuration determines the final rounded contour of the foliage being trimmed. The trimmer does not require continuous reorientation in order to form a rounded foliage contour. The desired round profile configuration can be formed without excessive manual dexterity or visual proportioning skill on the part of the person manipulating the trimmer.

A preferred embodiment of the invention comprises a blade assembly wherein each blade is curved in a plane coincident with the blade longitudinal axis and parallel to the planes of the blade longitudinal side edges. Cutter teeth are formed on one or both side edge(s) of each blade. The major faces of the blades are curved, rather than being flat. When the blade assembly is moved along a foliage surface, the foliage is automatically trimmed to a rounded profile condition without adjusting the cutting angle.

BRIEF DESCRIPTION OF THE DRAWINGS

FIG. 1 is a perspective view of a conventional foliage trimmer;

FIG. 2 is an exploded view of component parts of the trimmer of FIG. 1;

FIG. 3 is a side elevational view of a foliage trimmer according to the present invention;

FIG. 4 is a side elevational view of another foliage trimmer embodying the invention;

FIG. 5 is a fragmentary top plan view of the trimmer of FIG. 3; and

FIG. 6 is a fragmentary sectional view taken on line 6—6 in FIG. 5.

DESCRIPTION OF A PREFERRED EMBODIMENT OF THE INVENTION

A prior art foliage trimmer is shown in FIGS. 1 and 2 as comprising a motor located in a motor housing or drive power unit 5. As shown, the motor housing carries a first handle 11 and a second handle 12. A shield 14 extends in front of handle 12 between the person's hand and the cutting blade assembly 15. During a foliage trimming operation, the operator uses two hands to support and guide the mechanism along the foliage surface. Cutting blade assembly 15 comprises a stationary elongated flat blade 2, a reciprocatory elongated flat blade 3, and an elongated flat blade-retention plate 1. Major faces of the blades are flat and linear. Nut-bold fastener mechanisms 4 extend through plate 1 and the two blades at spaced points along the blade assembly to guide and retain the two blades in slidable engagement. Longitudinal slots 16 are defined in blade 3 along the blade longitudinal axis 20 to accommodate the shank portions of fasteners 4 while permitting the blade to move back and forth on the flat face of stationary blade 2, in the direction of arrow 17 in FIG. 1.

Each blade 2 or 3 has a series of cutting teeth 19 extending along its longitudinal side edges, such that reciprocatory motion of blade 3 in the arrow 17 direction causes foliage located in the tooth spaces to be severed. The foliage trimmer is moved laterally (transversely) across the foliage surface to achieve a trimming action.

FIG. 2 shows one type of motion transmitter that may be used between the motor and the blade assembly to reciprocate blade 3. A small gear 6 is carried on the motor shaft to rotate a larger gear 7. Eccentric drive pin 8 extends from gear 7 through a transverse slot 9 in blade 3. Stationary blade 2 has a large circular opening 21 therethrough for freely accommodating the projecting end of pin 8 as the pin rotates about the axis of gear 7. The interengagement between pin 8 and slot 9 causes blade 3 to reciprocate in a longitudinal direction, as indicated by arrow 17 in FIG. 1. Stationary blade 1 is secured in a fixed position on the motor housing.

FIGS. 3, 5 and 6 illustrate one form of the present invention. Power unit 5 and the associated handle structures may be constructed like the motor and handle structures shown in FIGS. 1 and 2. The motion transmitting connection between the motor and the blade assembly can be essentially like the pin-slot connection 8, 9 shown in FIG. 2.

The foliage trimmer of FIGS. 3, 5 and 6 comprises a stationary non-reciprocating blade 2, a reciprocatory blade 3, and a blade-retention plate 1. The two blades and the blade-retention plate are curved about an imaginary center point 23 that defines an axis normal to the plane of the paper in FIG. 3. The plane of each blade arc is coincident with the blade longitudinal axis 20 and parallel to the planes of the blade longitudinal side edges 27, such that each blade 2 or 3 has one major face convexly curved and one major face concavely curved. The two blades are slidably joined together, so that the concave arcuate face on blade 3 is slidably engaged with the convex arcuate face on blade 2. Blade 3 has a transverse slot therein, similar to slot 9 shown in FIG. 2. The two blades will be maintained in facial engagement by means of the arcuate retainer plate 1 and associated nut-bolt fasteners 4. Blade 3 reciprocates longitudinally in the plane of its arc.

The trimmer shown in FIG. 3 has a substantially semi-circular edge profile configuration. The motor is located at one end of the arcuately configured blade assembly. An auxiliary manually operable handle means 10 is attached to the other end of the blade assembly, i.e., to the stationary blade 2 and/or retainer plate 1.

The FIG. 3 trimmer is intended to be operated by two persons. One person grasps handles 11 and 12. The other person grasps handle 10. During a foliage trimming operation the two persons will be positioned on opposite sides of the bush, shrub or hedge being trimmed. The blade assembly can be moved in a vertical arc or in a horizontal arc about an individual shrub. The two persons will move bodily around the shrub or shift their arms in unison as the blade assembly 15 moves along or around the plant being trimmed. In the case of linear hedges the two persons will move linearly along side surface of the hedge.

FIG. 4 shows an apparatus that is essentially a larger version of the apparatus shown in FIG. 3. The FIG. 4 apparatus comprises a truck 30 having a vertical post 31 thereon for mounting a power unit 5 and one end of an associated curved blade assembly 15. The other end of the blade assembly is attached to a horizontal pin 10a adapted to seat in a yoke 33 on the upper end of a telescopic support structure 35.

Power unit 5 may have a swingable connection 37 with the adjacent end of blade assembly 15, such that the blade assembly can swing into or out of the plane of the paper (FIG. 4) about a horizontal axis defined by pin 10a. By thus swinging the blade assembly through a vertical arc it is possible to trim portions of a tree located within the swing path. The entire upper surface of the tree may be trimmed to a semi-spherical configuration. Post 31 and support structure 35 may be vertically adjustable to permit the trimming of trees of different heights.

The arcuate blade assembly may be formed of different arcuate lengths and radii of curvature in accordance with the nature of the foliage being trimmed. For a given blade assembly, the radius of curvature will be constant along the length of the blade assembly.

Thus there has been shown and described a novel vegetation trimming apparatus which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A foliage trimmer comprising:
   first and second elongated blades disposed in facial engagement with each other to define a blade assembly,
   each elongated blade having two elongated major faces and two elongated side edges interconnecting the major faces to define a longitudinal axis for the blade assembly, at least one side edge of each blade having cutter teeth extending therealong, the cutter teeth on the two blades being in overlapping cutting relationship,
   each said blade being curved in a plane coincident with the blade longitudinal axis and parallel to the planes of the blade longitudinal side edges, whereby one of the major faces on each blade has a convex arcuate contour, and the other major face on each blade has a concave arcuate contour,
   said blades being relatively slidable so that the convex arcuate face on the first blade is slidably engaged with the concave arcuate face on the second blade, and
   motor means operatively connected to one of said blades for reciprocating said one blade longitudinally relative to the other blade while the blades are maintained in facial engagement.

2. The foliage trimmer of claim 1, wherein:
   said motor means is at one end of the blade assembly, said trimmer further comprising
      manually operable handle means extending from the other end of the blade assembly.

3. The foliage trimmer of claim 1, wherein each blade has a substantially semi-circular edge profile configuration.

4. The foliage trimmer of claim 1, wherein:
   the reciprocating blade has a concave arcuate face in slidable engagement with a convex arcuate face on the other blade.

5. The foliage trimmer of claim 4, and further comprising:
   an elongated arcuate blade-retention plate having an arcuate concave surface overlying the convex arcuate face of the reciprocating blade.

6. The foliage trimmer of claim 5, and further comprising:
   a plurality of longitudinally spaced fasteners extending from the blade-retention plate through the reciprocating blade and into the non-reciprocating blade.

7. The foliage trimmer of claim 1, wherein:
   each blade arcuate face has a constant radius of curvature therealong.

* * * * *